United States Patent [19]

Moschner et al.

[11] Patent Number: 5,030,380

[45] Date of Patent: Jul. 9, 1991

[54] POLYMERIC ELECTROLYTE-HYDROGEN PEROXIDE ADDUCTS

[75] Inventors: Karl Moschner, Troy, N.Y.; Anthony Cece, Lyndhurst; Richard Gary, West New York, both of N.J.

[73] Assignee: Lever Brothers Company, division of Conopco, Inc., New York, N.Y.

[21] Appl. No.: 372,063

[22] Filed: Jun. 27, 1989

[51] Int. Cl.$^5$ .......................... C01B 15/01; C09K 3/00
[52] U.S. Cl. ................. 252/186.2; 252/186.38; 252/186.41; 252/186.29
[58] Field of Search ............. 252/186.29, 186.38, 252/186.43, 186.2

[56] References Cited

U.S. PATENT DOCUMENTS

| | | | |
|---|---|---|---|
| 3,055,897 | 9/1962 | Schwartz | 252/186.2 |
| 3,929,875 | 12/1975 | Rapko et al. | 260/537 R |
| 4,079,015 | 3/1978 | Paucot et al. | 252/95 |
| 4,231,890 | 11/1980 | Yagi et al. | 252/186.43 |
| 4,279,769 | 7/1981 | Yagi et al. | 252/186 |
| 4,455,249 | 6/1984 | Broze et al. | 252/186.25 |
| 4,539,130 | 9/1985 | Thompson et al. | 252/186.38 |
| 4,606,838 | 8/1986 | Buins | 252/186.38 |
| 4,655,975 | 4/1987 | Snoble | 260/503 |
| 4,772,290 | 9/1988 | Mitchell et al. | 8/107 |
| 4,853,143 | 8/1989 | Hardy | 252/186.38 |
| 4,919,845 | 4/1990 | Vogt et al. | 252/526 |
| 4,927,559 | 5/1990 | Schwarz et al. | 252/186.38 |

FOREIGN PATENT DOCUMENTS 252378 12/1987 Fed. Rep. of Germany .................. 252/186.27

*Primary Examiner*—Robert L. Stoll
*Assistant Examiner*—Joseph D. Anthony
*Attorney, Agent, or Firm*—Milton L. Honig

[57] ABSTRACT

A solid powdered peroxyhydrate is provided which is an adduct of hydrogen peroxide and a polymeric electrolyte, said polymeric electrolyte having the formula:

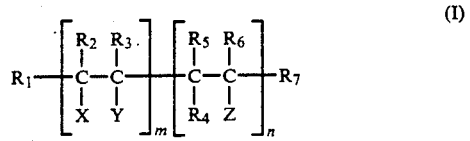

wherein
Y is selected from $CO_2^-M^+$ and $C_6H_4SO_3^-M^+$;
X and Z are independently selected from H, $OCH_3$, $CO_2R_8$ and Y;
$R_1$ through $R_7$ is independently selected from H and $C_1$–$C_3$ alkyl;
$R_8$ is $C_1$–$C_3$ alkyl;
m and n are the same or different integers ranging from 0 to 20,000; and
m+n is at least 3.

8 Claims, No Drawings

POLYMERIC ELECTROLYTE-HYDROGEN PEROXIDE ADDUCTS

BACKGROUND OF THE INVENTION

1. Field of the Invention

The invention is directed at novel polymeric electrolye-hydrogen peroxide adducts and mixtures of adducts with selected bleach precursor compounds. These materials are useful for bleaching laundry and hard surfaces.

2. The Related Art

Commercially the most common source of dry peroxide is that available in the form of sodium perborate tetrahydrate or monohydrate. Perborate is a material within the class of peroxyhydrates which are mixed salts of inorganic or organic acids forming peroxide containing compositions through hydrogen bonding. Perborate is somewhat special among these materials in that the peroxide is bound chemically as the cyclic diperoxy anhydride of boric acid rather than a comparatively weaker hydrogen bonded peroxyhydrate. Although the inorganic perborates are widely available at economical prices, by themselves they are inefficient bleaches.

A number of patents have reported dry organic hydrogen peroxide sources. U.S. Pat. No. 3,929,875 (Rapko et al.) discloses ethane tetracarboxylate perhydrates having a 1:4 ratio of peroxide to carboxylate. U.S. Pat. No. 4,279,769 (Yagi et al.) reports a bleaching composition of tetrasodium ethane tetracarboxylate/hydrogen peroxide adduct in combination with a class of carboxyimino compounds. Polycarboxylates and/or sulfonate such as disodium diglycolate were reported in U.S. Pat. No. 4,655,975 (Snoble) to form peroxyhydrates which could serve as a solid source for hydrogen peroxide. All the organic peroxyhydrates of the foregoing art provide additional building benefits over current common commercial peroxygen sources, especially in comparison to perborates and urea peroxyhydrate. Unfortunately, the materials reported in these patents are typically of lower oxygen activity. Larger doses are therefore required to deliver equivalent performance. Not only is there an economic penalty but the greater proportion required cuts down on the formulation space thereby hindering formulation flexibility. Moreover, the methods by which these peroxyhydrates are formed require mild processing conditions and, especially, low temperatures to avoid decomposition.

Several patents have focused upon stable liquid hydrogen peroxide bleach systems. U.S. Pat. No. 4,079,015 (Paucot et al.) discloses a liquid composition of hydrogen peroxide, a surfactant, and a salt of a polymer derived from an alpha-hydroxyacrylic acid. With this composition there is achieved stability against phase separation and reduced oxygen loss. DD 252 378 A1 (Lehmann et al.) is somewhat similar disclosing polymeric percarboxylic acids. Another patent, U.S. Pat. No. 4,772,290 (Mitchell et al.), discloses laundry bleaching compositions containing a dispersion of solid particulate peracid activator in an acidic aqueous hydrogen peroxide media.

A problem with the polymeric percarboxylic acids is the difficulty in achieving complete peroxidation. Normally there would be a very low ratio of peracid to each potentially available carboxylate group. Thus, there again arises the need for incorporating large dosages rendering the formula uneconomic and constricting the remaining room for other desirable formulation components.

Accordingly, it is an object of the present invention to provide a solid peroxyhydrate capable of delivering economic levels of active oxygen.

Another object of the present invention is to provide peroxyhydrates having improved storage stability.

A still further object of the present invention is to provide a peroxyhydrate that delivers high levels of active oxygen yet requires a low dosage level in a product formulation.

Yet another object of the present invention is to provide a peroxyhydrate that would not only deliver bleach performance but exhibit calcium sequestration and dispersant properties.

These and other objects of the present invention will become more readily evident in light of the following detailed description.

SUMMARY OF THE INVENTION

A solid powdered peroxyhydrate is provided which is an adduct of hydrogen peroxide and a polymeric electrolyte, said polymeric electrolyte having the formula:

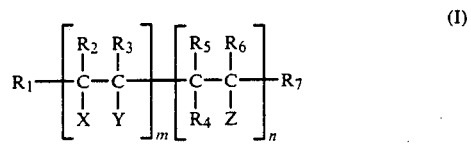

(I)

wherein

Y is selected from $CO_2^- M^+$ and $C_6H_4SO_3^- M^+$;

X and Z are independently selected from H, $OCH_3$, $CO_2R_8$ and Y;

$R_1$ through $R_7$ is independently selected from H and $C_1$-$C_3$ alkyl;

$R_8$ is $C_1$-$C_3$ alkyl;

m and n are the same or different integers ranging from 0 to 20,000; and m+n is at least 3.

Additionally there is reported a bleaching composition comprising the solid powder adduct of the formula (I) intimately mixed with a bleach precursor, the precursor and adduct being present in a respective weight ratio of from 1:1 to 1:10, the precursor having a pseudo first order perhydrolysis rate constant of less than about 1.0 min$^{-1}$ at 40° C., pH 9.0, in a 0.1 M borate buffer using 0.9 mM precursor concentration.

DETAILED DESCRIPTION OF THE INVENTION

Now it has been found that the aforestated objectives can be met by a new class of polymeric peroxyhydrates. These polymers are adducts of hydrogen peroxide with polyelectrolytes (carboxylate or sulfonate) with very high binding ratios of about 1:1 peroxide to electrolyte. Good thermal stability has been noted which permits these materials to be isolated not only by evaporation of water under ambient conditions but also by spray drying at elevated temperatures (70° C.).

Not only do the new polymers have builder and chelating activity but they also possess advantageous physicochemical characteristics. They perform as dispersants in solution and as structuring agents; they may also be used as binders in combination with other materials.

Polymeric peroxyhydrates of the present invention are solid powders having the formula:

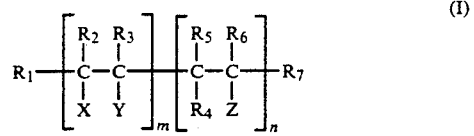

(I)

wherein

Y is selected from $CO_2^-M^+$ and $C_6H_4SO_3^-M^+$;

X and Z are independently selected from H, $OCH_3$, $CO_2R_8$ and Y;

$R_1$ through $R_7$ is independently selected from H and $C_1$–$C_3$ alkyl;

$R_8$ is $C_1$–$C_3$ alkyl;

m and n are the same or different integers ranging from 0 to 20,000; and m+n is at least 3.

Polymeric electrolyte components of this invention consist of a variety of vinylic homo- and copolymers. These include but are not limited to those formed by polymerization of monomers selected from acrylic acid, methacrylic acid, maleic anhydride, styrene, sulfonated styrene, vinyl acetate, vinyl sulfonate, acrylamide and their derivatives and mixtures thereof.

Illustrative of these materials are sodium polyacrylate peroxyhydrate, sodium poly(acrylate-co-maleate) peroxyhydrate, poly(methoxyvinyl ether-co-malate) peroxyhydrate. Sodium polymaleate peroxyhydrate, poly(ethylene-co-maleate) peroxyhydrate, poly(vinyl acetate-co-maleate) peroxyhydrate and sulfonated poly(styrene-co-maleate) peroxyhydrate. Most preferred are the peroxyhydrates of sodium polyacrylate, poly(ethylene-co-maleate), poly(methoxyvinyl ether-co-maleate) and sulfonated poly(styrene-co-maleate). Each of the foregoing can be prepared in a form to deliver over 8% average active oxygen.

Adducts of this invention will have a ratio of molar % anionic group (polymer) to molar % hydrogen peroxide ranging from about 3:1 to 1:3, preferably about 1:1. Normally, there will be from about 10 wt. % to about 25 wt. % peroxide in each adduct molecule.

A most convenient procedure for preparation of small quantities of polymer peroxyhydrates involves evaporation of aqueous solutions of the polymers with a slight excess of hydrogen peroxide calculated as the molar ratio of peroxide to functional group (e.g. amide, carboxyl or sulfonyl group). For instance, polyacrylate peroxyhydrate was isolated by spray drying. This material was also prepared directly by blending concentrated hydrogen peroxide with the respective powdered dry polymer.

Several processing conditions were found beneficial in preparing polymer peroxyhydrates from aqueous solutions. Concentrations in the aqueous mixture were maximized by using polymer solutions as provided by the raw material suppliers, typically 20–50 wt. %. Polymer solution pH was adjusted to 5–8 to maximize the resultant polymer peroxyhydrate activity. Concentrated (30–70 wt. %) peroxide may be used to minimize dilution. Optimally, the amount of peroxide used should be slightly in excess of 1:1, peroxide:electrolyte group (carboxylate or sulfonate). Water can generally be evaporated from thin films of the polymer peroxyhydrate solution under ambient solutions. Residue resulting therefrom may then be dried under vacuum at 100–150 mm at 40°–50° C. over a drying agent such as phorphorous pentoxide to achieve a constant weight.

Polymer peroxyhydrate solution pH was particularly important. Both higher and lower pH will result in reduced activity. Lower pH has a particularly negative impact on carboxylated polymer. Very low pH can also result in the undesirable peracid formation. Higher pH may result in more rapid decomposition of peroxide in solutions and, thus, in a reduction in the polymer peroxyhydrate activity.

Another aspect of the present invention concerns bleach compositions arising from intimate dry mixtures of the polymeric peroxyhydrate with a bleach precursor. Only those bleach precursors are encompassed within this invention that have a pseudo first order perhydrolysis rate of less than 1.0 min$^{-1}$ measured at 40° C., pH 9.0, in the presence of 0.1 M borate buffer using 0.90 mM precursor concentration. Weight ratios of precursor to polymeric peroxyhydrate will range from about 1:1 to about 1:10, optimally between about 1:1.5 to about 1:3, optimally about 1:2.

Illustrative of suitable precursors are sodium benzoyloxybenzene sulfonate (SBOBS) and sodium n-hexyloxycarbonyloxybenzene sulfonate (SHCOBS).

Both the polymeric peroxyhydrates and combinations of these with bleach precursors have been found useful in fabrics laundry applications. They can be incorporated into powdered laundry detergents along with the usual components including 0.5–20% surfactants, 5–80% builder and from 0.1 to 20% of cleaning adjuncts such as lather boosters or depressants, anti-redeposition agents, fabric softeners, fillers, fluorescent whitening agents, perfumes, enzymes, germicides and colorants. Liquids may also be formulated based upon dispersion of polymeric peroxyhydrate/precursor in water.

Since the polymeric peroxyhydrates deliver not only peroxide but also function as sequestrants and dispersants, they can be advantageously employed as part of a cleaning sheet. These sheets are normally flexible substrates formed from woven or non-woven paper, natural fiber or synthetic fiber. For example, the substrate may be of rayon, polyester, polyethylene or polypropylene. Impregnated into the substrate may be a paste-like composition of bleach precursor and/or polymeric peroxyhydrate alongside other detergent ingredients (surfactants, builders and adjunct materials). The amount of peroxyhydrate relative to substrate may range from 10:1 to 1:10, preferably from about 2:1 to 1:2 by weight.

Polymeric peroxyhydrates and compositions described hereinabove are useful in a variety of cleaning products. These include laundry detergents, laundry bleaches, hard surface cleaners, toilet bowl cleaners, automatic dishwashing compositions and even denture cleansers.

The following examples will more fully illustrate the embodiments of this invention. All parts, percentages and proportions referred to herein and in the appended claims are by weight unless otherwise stated.

EXAMPLE 1

General Experimental Details

The polymers were obtained as aqueous solutions by suppliers and were used as provided. All other chemicals were of Reagent Grade. Deionized water was used exclusively for all dilutions. Only non-metal or teflon coated stainless steel utensils and labware were used.

Total available oxygen activities were determined by automatic standard iodometric methods using ammonium molybdate to catalyze iodide oxidation by peroxide. Potentiometric determination of the end point was performed on a Brinkmann 672 autotitrater. Thermogravimetric analyses were conducted using a Perkin-Elmer Series 7 Thermal Analysis System under a stream of dry nitrogen, with a heating rate of 5° C./min., using sample weights of 5-10 mg.

Method A. General Procedure for Preparation of Peroxyhydrates from Aqueous Solutions A 20-50 wt. % aqueous solution of the desired polymer was prepared and, if necessary, the pH was adjusted to the desired value by dropwise addition of 10-50 wt. % sodium hydroxide solution or 50-85 wt. % phosphoric acid to the stirred solution. Sufficient concentrated aqueous hydrogen peroxide was then added at room temperature to give slightly greater than a 1:1 molar ratio of hydrogen peroxide to the functional group (carboxylate, sulfonate, amide, etc.). A final pH adjustment was made, where necessary, and then a thin film of the solution was initially evaporated overnight under ambient conditions. Thereafter the polymer peroxyhydrate was dried in a vacuum oven at 100 mm and 40°-50° C. over phosphorous pentoxide. The polymer peroxyhydrate were characterized by their oxygen activities, and storage and thermal stabilities.

Specific Example: Sodium Polyacrylate Peroxyhydrate

A 40 wt. % solution of sodium polyacrylate (50 g, pH 7.0, Rohm & Haas LMW-100N, MW=10,000) was adjusted to pH 6.0 using 85 wt. % phosphoric acid. A 30 wt. % solution of hydrogen peroxide (25 g) was then added to the polymer solution with good stirring. The resulting solution was then poured into a large crystallizing dish forming a puddle about 5 mm deep. After being allowed to evaporate overnight in a fume hood, the material was dried to constant weight at 150 mm, 40° C., over $P_2O_5$. Sodium polyacrylate peroxyhydrate was obtained with 10.2 wt. % average oxygen activity.

Compounds prepared in this manner are listed in Table I along with other known dry sources of hydrogen peroxide.

TABLE I

| Hydrogen Peroxide Sources | |
|---|---|
| Known Peroxide Sources | % av. [O] |
| Sodium perborate, $Na_2H_4B_2O_8 \cdot xH_2O$, | |
| x = 1 | 15.5 |
| x = 4 | 10.5 |
| Sodium Carbonate Peroxyhydrate, $Na_2CO_3 \cdot H_2O_2$ | 14.0 |
| Urea Peroxyhydrate, $H_2NCONH_2 \cdot H_2O_2$ | 17.0 |
| Sodium Diglycolate Peroxyhydrate, $Na_2(CO_2CH_2)_2O \cdot xH_2O_2$ | |
| x = 2.5 | 15.2 |
| x = 1 | 7.5 |
| Sodium Ethane Tetracarboxylate Peroxyhydrate $Na_4(CO_2)_2CH_2CH_2(CO_2)_2 \cdot H_2O_2$ | 4.9 |
| Polymers Used to Prepare | $T^b$ |

TABLE I-continued

| Hydrogen Peroxide Sources | | | |
|---|---|---|---|
| Peroxyhydrates[a] | pH | (°C.) | % av. [O] |
| LMW-100N | 3.0 | 100 | 3.8 |
| | 4.0 | | 3.1 |
| | 5.0 | | 8.0 |
| | 6.0 | | 6.1 |
| | 7.0 | | 10.2 |
| | 8.0 | | 10.0 |
| | 9.0 | | 0.5 |
| LMW-20N | 6.5 | 90 | 8.4 |
| EMA-1103 | 5.0 | 114 | 11.5 |
| | 7.0 | | 11.0 |
| Sokalan CP-7 | 9.5 | 110 | 4.5 |
| | 7.5 | | 5.7 |
| MVMA | 5.0 | 110 | 5.5 |
| | 7.0 | | 12.0 |
| Belclene | 7.3 | 112 | 6.4 |
| EAMA | 2.5 | 115 | 1.6 |
| | 7.0 | | 3.2 |
| Gantrez | 6.1 | 115 | 1.2 |
| Versa-TL3 | 5.0 | 140 | 5.5 |
| | 7.0 | | 8.5 |
| | 8.5 | | 2.6 |
| Sulfonated polystyrene | 4.5 | 130 | 7.2 |
| | 7.5 | | 7.0 |
| Polyacrylamide | 5.0 | 120 | 0.0 |
| Polyvinyl Pyrrolidone | 5.5 | 122 | 2.7 |

[a]LMW-100N, Rohm & Haas, 10,000 MW sodium polyacrylate
LMW-20N, Rohm & Haas, 2,000 MW sodium polyacrylate
EMA-1103, Arco, 25,000 MW poly(ethylene-co-maleate)
Sokalan CP-7, BASF, 50,000 MW sodium poly(acrylate-co-maleate)
MVMA, Aldrich Chemicals, poly(methoxyvinyl ether-co-maleate)
Belclene, Ciba-Geigy 800 MW sodium polymaleate
EAMA, poly(ethyl acrylate-co-maleate)
Gantrez, GAF, 40,000 MW poly(vinylacetate-co-maleate)
Versa-TL3, National Starch, sulfonated poly(styrene-co-maleate)
[b]Ignition temperatures.

Peroxide binding in peroxyhydrates is attributed to hydrogen bonding between electron rich functional groups and the peroxide hydrogens. Comparisons of polymer peroxyhydrate activities and structural formulas provides a measure of binding efficiency. The data in Table I clearly demonstrate that polyelectrolytes are superior to polyamides such as polyacrylamide and poly(vinylpyrrolidone). The calculated peroxide:electrolyte (carboxylate or sulfonate) ratios for polymers of known structure (Table II) shows that carboxylate and sulfonate groups are equivalent with a ratio approximately 1:1. This binding ratio is significantly greater than that reported for sodium ethane tetracarboxylate of 1:4 and is also greater than that reported for sodium diglycolate monoperoxyhydrate of 1:2.

Interestingly, more functionalized polymers such as Sokalan CP-7, a poly(acrylate-co-maleate), and Belclene, an oligomeric maleate, were found to have a maximum ratio of 1:3.

TABLE II

| Polymer Peroxyhydrate Peroxide:Electrolyte Ratios | | | |
|---|---|---|---|
| Polymer | Repeat Units | % av [O] | $H_2O_2$:Electrolyte |
| LMW-100N | $-CH_2CH(COO^-Na^+)-$ | 10.2 | 1:0.8 |
| EMA-1103 | $-CH_2CH_2(CHCOO^-Na^+)_2-$ | 11.5 | 1:0.9 |
| Sokalan CP-7 | $-CH_2(COO^-Na^+)_3-$ | 5.7 | 1:3 |
| Belclene | $-CH(COO^-Na^+)-$ | 6.4 | 1:3 |
| Sulfonated Polystyrene | $-CH_2CH(C_6H_4SO_3^-Na^+)-$ | 7.0 | 1:1 |

EXAMPLE 2

Method B. Preparation of Sodium Polyacrylate Peroxyhydrate by Spray Drying

A solution of the polymer peroxyhydrate prepared by adding a 30 wt. % hydrogen peroxide solution (100 g) to a pH 5-7 40 wt. % sodium polyacrylate solution (100 g, Rohm & Haas LMW-100N) was spray dried using a Yamato GB-21 lab scale spray dryer. The dryer was operated at a drying air temperature of 70° C., atomizing air pressure of 1.25 KgF/cm$^2$, drying air velocity of 0.28$m^3$, and solution pumping rate speed about 5 mL/min. This provided 100 g sodium polyacrylate peroxyhydrate with an activity of 10 wt. % average oxygen at a production rate of 20-25 g/hr.

Low drying air temperatures were used to avoid thermal degradation and possible ignition of the peroxyhydrate.

EXAMPLE 3

Method C. Preparation of Sodium Polyacrylate Peroxyhydrate by Dry Blending

A 40 wt. % solution of sodium polyacrylate (200 g) was adjusted to pH 6.0, and then it was freeze dried. Using a mortar and pestal, a 50 g sample of the dry sodium polyacrylate was ground into a fine powder and then an excess of 70 wt. % hydrogen peroxide solution (25 g) was added gradually with constant blending. The resulting paste was then dried as described above to give sodium polyacrylate peroxyhydrate with an activity of 11.5 wt. % average oxygen.

EXAMPLE 4

Polymeric Peroxyhydrate and Bleach Precursor Compositions

A number of compositions were prepared consisting of polyacrylate peroxyhydrate and bleach precursors, specifically peracid precursors. The bleach precursor was dispersed in a neutral polyacrylate peroxyhydrate solution and then coprecipitated upon evaporation of the water to provide an intimate mixture. All precursors were evaluated at pH 7.0 to minimize their hydrolysis and perhydrolysis. Four precursors were tested. These were sodium benzoyloxybenzenesulfonate (SBOBS), sodium n-hexyloxycarbonyloxybenzenesulfonate (SHOBS), sodium n-nonanoyloxybenzenesulfonate (SNOBS), and cholyloxycarbonyloxybenzenesulfonate (CSPC). See Table III.

Both SNOBS and CSPC were incompatible with the polyacrylate peroxyhydrate solution. SNOBS perhydrolyzed giving detectable levels of pernonanoic acid. CSPC formed a homogeneous solution which dried with difficulty over a period of three days providing no remaining activity.

SBOBS and SHOBS were compatible with the polyacrylate peroxyhydrate solution and yielded dry compositions on evaporation of the water with no evidence of peracid formation. Furthermore, a suspension of SBOBS in a polyacrylate peroxyhydrate solution showed no appreciable loss in total activity and no peracid formation when monitored over a period of 3.5 days at 20°-22° C. Similarly, a sample of the dry SBOBS polyacrylate peroxyhydrate showed only a slight decrease in total activity with no peracid formation when stored in a glass jar for three weeks at 20°-22° C. Specific preparation of precursor/polyacrylate peroxyhydrate is described below.

Preparation of Precursor/Polyacrylate Peroxyhydrate Compositions

A pH 7.0 solution of sodium polyacrylate (LMW-100N) peroxyhydrate (65 g, 0.36 mol of carboxyl group) and 70 wt. % hydrogen peroxide (20 g, 0.40 mol H$_2$O$_2$) was prepared and then the precursor (0.10 mol) was added with good mixing to form a slurry. The mixture was transferred to a crystallizing dish. Therein the mixture was air dried overnight and then dried under vacuum (100-150 mm) over P$_2$O$_5$ to give the peroxyhydrate precursor mixtures listed in Table III. Peroxide and peracid activities were determined by successive ceric sulfate and iodometric titrations, respectively.

TABLE III

| | Precursor-Polyacrylate Peroxyhydrate Compositions | | |
|---|---|---|---|
| Precursor | Formula | Pseudo 1st Order Perhydrolysis Rate (min$^{-1}$)[d] | % av [O][a] |
| SHCOBS | CH$_3$(CH$_2$)$_5$OCOOC$_6$H$_4$SO$_3$$^-$Na$^+$ | 0.5 | 6.4 |
| SBOBS | C$_6$H$_4$COO-p-C$_6$H$_4$SO$_3$$^-$Na$^+$ | 0.8 | 5.5 |
| SNOBS | CH$_3$(CH$_2$)$_8$COOC$_6$H$_4$SO$_3$$^-$Na$^+$ | 1.3 | (0.3)[b] |
| CSPC | (CH$_3$)$_3$N$^+$CH$_2$CH$_2$OCOOC$_6$H$_4$SO$_3$$^-$ | 5.5 | 0[c] |

[a]For the dry precursor-peroxyhydrate composition.
[b]Peracid activity.
[c]No activity detected after drying for three days.
[d]Measured at 40° C., pH of 9.0, 0.1 M borate buffer using 0.90 mM precursor.

EXAMPLE 5

A series of wash studies were conducted under uniform simulated wash conditions to provide comparison between dissolution rates and bleaching performance. Aliquots of the wash liquor were taken and evaluated to determine both rates of dissolution and, in cases involving precursors, peracid formation. The following procedure was employed for these studies.

Wash Studies. A Kenmore heavy-duty washer was filled to a volume of 64 liters (17 gals.) with warm Edgewater municipal water at 38° C. (100° F.). Six pounds of clean dry cotton ballast cloths were then added. The detergent, p-Surf (95 g), was added to the agitating washer. After 2 minutes, the pH was recorded and two 4"×6" swatches of each bleach monitor were added, typically selected from BC-1 (tea), EMPA-114 (wine), and EMPA-115 (ink). The wash cycle was immediately restarted and then the bleaching agent (in sheet form or as powder) was added. At frequent convenient intervals measured as the elapsed time from addition of the bleach, 75-100 g aliquots of the wash liquor were taken and analyzed titrimetrically for available oxygen content due to peroxide and/or peracid formed. Results of the study are recorded in Tables IV and V.

TABLE IV

| Peroxyhydrate Composition Bleaching Performance[a] | | | | |
|---|---|---|---|---|
| Peroxyhydrate Composition | Total av. [O] ppm | BC-1 (Tea) | EMP-114 (Wine) | EMPA-115 (Ink) |
| Polyacrylate | 9.0 | −0.4 | — | 2.4 |
| SBOBS-Polyacrylate | 16.9[b] | 5.5 | 13.7 | 6.1 |

TABLE IV-continued

Peroxyhydrate Composition Bleaching Performance[a]

| Peroxyhydrate Composition | Total av. [0] ppm | BC-1 (Tea) | EMP-114 (Wine) | EMPA-115 (Ink) |
|---|---|---|---|---|
| SBOBS + Perborate[c] | (30[c]) | (6.1) | (16.0) | — |

[a]Bleaching values for the polyacrylate are in units of $R_d$ while those for SBOBS-polyacrylate are $R_d$ versus peroxide as perborate at the same av. [0] dose.
[b]A maximum of 6.0 ppm av. [0] as perbenzoic acid was generated in the wash.
[c]Work conducted with perborate monohydrate dosed at 30 ppm total av. [0] and delivery of maximum 10 ppm av. [0] as perbenzoic acid.

TABLE V

Wash Study Data For Percursor Polyacrylate Peroxyhydrates

| | SBOBS[a] | | SHOBS[b] | |
|---|---|---|---|---|
| Time min. | ppm av. [0][c] Peroxide | ppm av. [0][d] Peracid | ppm av. [0][c] Peroxide | ppm av. [0][e] Peracid |
| 1 | 1.0 | 0.0 | 14.7 | 3.6 |
| 2 | 16.2 | 0.0 | — | — |
| 3 | 16.0 | 0.0 | 12.3 | 6.5 |
| 4 | 15.4 | 0.0 | — | — |
| 5 | — | — | 12.4 | 6.3 |
| 6 | 14.1 | 3.0 | — | — |
| 7 | — | — | 12.3 | 6.4 |
| 8 | 10.9 | 3.3 | — | — |
| 10 | — | — | 12.5 | 6.1 |
| 11 | 13.5 | 3.6 | — | — |
| 15 | 10.4 | 6.7 | 12.5 | 5.6 |

[a]Bleach sheet. dosed at 17.5 ppm av. [0] at initial pH 9.1.
[b]Neat powder dosed at 20 ppm av. [0], initial pH 9.1.
[c]By potentiometric ceric sulfate titration of wash aliquots.
[d]The differences of peroxide av. [0] of 15.3, 17.7, 16.9, and 17.6 at 3, 7, 9, and 15 minutes, respectively.
[e]By successive potentiometric iodometric titration.

Bleach sheets were prepared from polyacrylate peroxyhydrate both with and without SBOBS peracid precursor. Samples of the slurry were painted onto 9"×11" pieces of a polyester nonwoven substrate. They were then allowed to dry under ambient conditions. These were then employed in simulated wash studies reported in Table V. Dissolution and bleaching performance were evaluated.

Polyacrylate peroxyhydrate, dosed as a bleach sheet, dissolved completely within two minutes. Table V reports the results from wash studies of SBOBS-polyacrylate peroxyhydrate bleach sheet and a powdered SHOBS-polyacrylate peroxyhydrate composition. Bleaching performance was determined by measuring the change in reflectance of uniformly stained monitor cloths and these results are reported in Table IV.

EXAMPLE 6

Thermal Stability Studies

Studies were conducted to evaluate the susceptibility of several polymer peroxyhydrates and their compositions to hazardous ignition at elevated temperatures. Ignition temperatures are reported in Table I. Evident from the data therein is that the polymer peroxyhydrates have adequate thermal stability. This stability permits these compounds to be spray dried. Procedures for determining ignition temperatures ($T_i$) are described below.

Ignition Temperature Tests

This test exposes materials to elevated temperatures which may result in violent exothermic reactions. Therefore, all operations were conducted in a well ventilated fume hood with appropriate precautions for personal safety.

A 1.5–2.0 g sample (Note 1) of the material to be tested was placed in a thick-walled 25×200 mm test tube. A fine thermocouple probe in a protective PYREX glass sleeve was inserted in a sand heating bath constructed from a heating mantle. A safety shield was placed around the sand bath which was then heated at a rate of 4–5° C./min (Note 3) by applying an appropriate fixed voltage while the sample temperature was recorded. Typically, the test was halted when the sample temperature exceeded 200° C. Analysis of the curve produced from plotting the sample temperature versus time provided the ignition temperatures ($T_i$) and indications of other physical/chemical changes which result in changes in the samples' heat capacity.

Note 1: The sample size may be varied depending on the intensity of the thermal transitions and the potential hazards. The sensitivity of the thermocouple, however, typically requires a minimum sample of 1 g while samples greater than 5 g may present an unacceptable hazard.

Note 2: The heating rate of 4–5° C./min was specified to complete tests in 20–30 mins. and to minimize dissipation of exotherms through dissipation of the heats of reaction by the apparatus.

Note 3: The autoignition test was conducted at voltages of 30, 40, 50 and 60, using sodium chloride. Each run yielded a constant heating rate over the course of the experiment. The voltage required to give the desired heating rate 4–5° C./min (Note 2) was then determined from a plot of the voltage versus the heating rates.

The foregoing description and examples illustrate selected embodiments of the present invention. In light thereof, various modifications will be suggested to one skilled in the art, all of which are in the spirit and purview of this invention.

What is claimed is:

1. A solid powdered peroxyhydrate composition comprising a mixture of
   (i) a bleach precursor, said precursor having a pseudo first order perhydrolysis rate of less than 1.0 min$^{-1}$ measured at 40° C., pH 9.0, 0.1 M borate buffer using 0.90 mM precursor concentration, and
   (ii) an adduct of hydrogen peroxide and a polymeric electrolyte, said polymeric electrolyte having the formula:

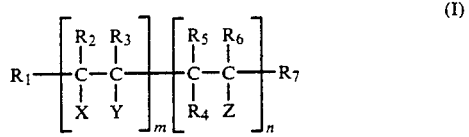

(I)

wherein
Y is selected from $CO_2^-M^+$ and $C_6H_4SO_3^-M^+$;
X and Z are independently selected from H, $OCH_3$, $CO_2R_8$ and Y;
$R_1$ through $R_7$ is independently selected from H and $C_1$–$C_3$ alkyl;
$R_8$ is $C_1$–$C_3$ alkyl;
m and n are the same or different integers ranging from 0 to 20,000;
m+n at least 3; and
M+ is sodium.

2. A polymeric peroxyhydrate composition according to claim 1 wherein molar % anionic groups of the polymer to molar % hydrogen peroxide ranges from about 3:1 to about 1:1.

3. A polymeric peroxyhydrate composition according to claim 1 wherein the polymeric electrolyte is a homo- or co-polymer formed from monomers selected from the group consisting, salt and ester derivatives of acrylic acid, methacrylic acid, maleic anhydride, styrene, sulfonated styrene, vinyl acetate, vinyl sulfonate, acrylamide and mixtures thereof.

4. A polymeric peroxyhydrate composition according to claim 1 wherein the polymeric electrolyte is selected from the group consisting of sodium polyacrylate, poly(ethylene-co-maleate), sodium poly(acrylate-co-maleate), poly(methoxyvinyl ether-co-maleate), sodium polymaleate, poly(ethyl acrylate-co-maleate), poly(vinyl acetate-co-maleate), sulfonated poly(styrene-co-maleate), sulfonated polystyrene and mixtures thereof.

5. A polymeric peroxyhydrate composition according to claim 1 prepared at a pH from about 5 to about 8.

6. A polymeric peroxyhydrate composition according to claim 1 wherein the ratio of said precursor to peroxyhydrate ranges from about 1:1 to about 1:10.

7. A polymeric peroxyhydrate composition according to claim 1 wherein the precursor to peroxyhydrate is present in a weight ratio of about 1:2.

8. A polymeric peroxyhydrate composition according to claim 1 wherein said precursor is selected from the group consisting of sodium benzoyloxybenzene sulfonate and sodium.

* * * * *